(12) United States Patent
Gila et al.

(10) Patent No.: US 11,390,091 B2
(45) Date of Patent: *Jul. 19, 2022

(54) WRITING ELECTRONIC PAPER

(71) Applicant: HEWLETT-PACKARD DEVELOPMENT COMPANY, L.P., Spring, TX (US)

(72) Inventors: Omer Gila, Palo Alto, CA (US); Napoleon J. Leoni, Palo Alto, CA (US); Steven Rosenberg, Palo Alto, CA (US); Henryk Birecki, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,745

(22) Filed: Jan. 15, 2020

(65) Prior Publication Data

US 2020/0147978 A1 May 14, 2020

Related U.S. Application Data

(63) Continuation of application No. 15/664,466, filed on Jul. 31, 2017, now Pat. No. 10,538,111, which is a (Continued)

(51) Int. Cl.
*B41J 3/407* (2006.01)
*G02F 1/1673* (2019.01)
*G02F 1/167* (2019.01)

(52) U.S. Cl.
CPC .......... *B41J 3/4076* (2013.01); *G02F 1/1673* (2019.01); *G02F 1/167* (2013.01)

(58) Field of Classification Search
CPC ...... G09G 3/344; G09G 3/3433; G09G 3/348; G09G 3/3446; G02B 26/004; G02B 26/005
(Continued)

(56) References Cited

U.S. PATENT DOCUMENTS 3,668,106 A 6/1972 Ota
4,558,334 A 12/1985 Fotland
(Continued)

FOREIGN PATENT DOCUMENTS

EA 003306 2/2001
JP 56-164360 A 12/1981
(Continued)

OTHER PUBLICATIONS

Chen, J. et al. "Technology Advances in Flexible Displays and Substrates", Ieee Access 1 (2013): 150-158.
(Continued)

*Primary Examiner* — Ram A Mistry
(74) *Attorney, Agent, or Firm* — HP Inc. Patent Department

(57) ABSTRACT

Embodiments of the present invention are directed to systems and methods for writing on electronic paper ("e-paper") and display platforms implemented with e-paper. In one aspect, a system for writing information to electronic paper includes a writing module and an erasing unit connected to the writing module. The erasing unit is configured to erase information stored in the electronic paper. The system also includes a writing unit connected to the writing module and is configured to write information to the electronic paper. Information is written to the electronic paper by orienting the writing module so that the electronic paper passes the erasing unit prior to passing the writing unit.

20 Claims, 14 Drawing Sheets

Related U.S. Application Data continuation of application No. 12/792,301, filed on Jun. 2, 2010, now abandoned.

(58) Field of Classification Search
USPC ............... 345/156, 179; 178/19.01–19.4
See application file for complete search history.

(56) References Cited

U.S. PATENT DOCUMENTS

| | | | |
|---|---|---|---|
| 4,584,592 A | 4/1986 | Tuan et al. | |
| 4,588,997 A | 12/1986 | Tuan et al. | |
| 4,816,653 A | 3/1989 | Anderl et al. | |
| 4,972,212 A | 11/1990 | Hauser et al. | |
| 5,225,856 A | 7/1993 | Thieret et al. | |
| 5,276,438 A | 1/1994 | Disanto | |
| 5,351,995 A | 10/1994 | Booker | |
| 5,389,945 A | 2/1995 | Sheridon | |
| 5,538,291 A | 7/1996 | Gustafson | |
| 5,545,883 A | 8/1996 | Sasou et al. | |
| 5,866,284 A | 2/1999 | Vincent | |
| 6,057,907 A | 5/2000 | Satoh et al. | |
| 6,081,285 A | 6/2000 | Wen et al. | |
| 6,222,513 B1 | 4/2001 | Howard et al. | |
| 6,333,754 B1 | 12/2001 | Oba et al. | |
| 6,362,845 B1 | 3/2002 | Genovese | |
| 6,400,492 B1 | 6/2002 | Morita | |
| 6,407,763 B1 | 6/2002 | Yamaguchi et al. | |
| 6,424,387 B2* | 7/2002 | Sato .................. | G02F 1/133348 349/171 |
| 6,426,827 B1 | 7/2002 | Bonhote et al. | |
| 6,456,272 B1 | 9/2002 | Howard | |
| 6,515,790 B2* | 2/2003 | Miyamoto ............ | G02F 1/1679 359/296 |
| 6,550,997 B1 | 4/2003 | King et al. | |
| 6,556,470 B1 | 4/2003 | Vincent et al. | |
| 6,573,880 B1 | 6/2003 | Simoni et al. | |
| 6,700,695 B2 | 3/2004 | Engler et al. | |
| 6,707,479 B1 | 3/2004 | Pan et al. | |
| 6,738,050 B2 | 5/2004 | Comiskey et al. | |
| 6,795,228 B2 | 9/2004 | Sacripante et al. | |
| 6,822,893 B2 | 11/2004 | Vincent et al. | |
| 6,839,158 B2 | 1/2005 | Albert | |
| 6,982,734 B2 | 1/2006 | Pan et al. | |
| 7,114,864 B2 | 10/2006 | Shimoda et al. | |
| 7,140,550 B2 | 11/2006 | Ramachandran | |
| 7,188,762 B2 | 3/2007 | Goade, Sr. et al. | |
| 7,223,672 B2 | 5/2007 | Kazlas et al. | |
| 7,256,766 B2 | 8/2007 | Albert | |
| 7,265,894 B2 | 9/2007 | Schmitz | |
| 7,284,708 B2 | 10/2007 | Martin | |
| 7,408,699 B2 | 8/2008 | Wang et al. | |
| 7,442,587 B2 | 10/2008 | Amundson et al. | |
| 7,463,400 B1 | 12/2008 | Tatsuura et al. | |
| 7,499,211 B2 | 3/2009 | Suwabe et al. | |
| 7,557,983 B2 | 7/2009 | Schmitz | |
| 7,580,845 B2 | 8/2009 | Burman et al. | |
| 7,663,582 B2 | 2/2010 | Schmitz et al. | |
| 7,789,489 B2 | 9/2010 | Matsuzoe | |
| 7,834,843 B2 | 11/2010 | Karaki | |
| 7,855,711 B2 | 12/2010 | Schmitz | |
| 7,875,307 B2 | 1/2011 | Lin et al. | |
| 7,975,927 B1 | 7/2011 | Whitney | |
| 8,018,410 B2 | 9/2011 | Schmitz et al. | |
| 8,144,388 B2 | 3/2012 | Ogawa | |
| 8,279,167 B2 | 10/2012 | Cato | |
| 8,379,294 B2 | 2/2013 | Jun | |
| 8,389,381 B2 | 3/2013 | Amundson et al. | |
| 8,514,256 B2 | 8/2013 | Ogawa et al. | |
| 8,545,302 B2 | 10/2013 | Wu et al. | |
| 8,830,160 B2 | 9/2014 | Gila | |
| 2001/0020935 A1 | 9/2001 | Gelbman | |
| 2001/0055000 A1 | 12/2001 | Kanae et al. | |
| 2002/0021911 A1 | 2/2002 | Matsuura et al. | |
| 2002/0057250 A1 | 5/2002 | Michaelis | |
| 2002/0131151 A1 | 9/2002 | Engler et al. | |
| 2002/0135859 A1 | 9/2002 | Haga | |
| 2002/0145792 A1 | 10/2002 | Jacobson et al. | |
| 2002/0180687 A1 | 12/2002 | Webber | |
| 2003/0025855 A1 | 2/2003 | Holman et al. | |
| 2003/0067427 A1 | 4/2003 | Comiskey et al. | |
| 2003/0117456 A1 | 6/2003 | Silverbrook et al. | |
| 2004/0263470 A1 | 12/2004 | Sprague et al. | |
| 2005/0001810 A1 | 1/2005 | Yakushiji et al. | |
| 2005/0134550 A1 | 6/2005 | Schmitz | |
| 2005/0134553 A1 | 6/2005 | Schmitz et al. | |
| 2005/0247797 A1 | 11/2005 | Ramachandran | |
| 2005/0259068 A1 | 11/2005 | Nihei et al. | |
| 2006/0017659 A1* | 1/2006 | Ogawa .................. | B41J 3/46 345/30 |
| 2006/0125778 A1 | 6/2006 | Apte | |
| 2006/0170981 A1 | 8/2006 | Ricks | |
| 2007/0002428 A1 | 1/2007 | Liu | |
| 2007/0045399 A1 | 3/2007 | Martin | |
| 2007/0061214 A1 | 3/2007 | Schmitz | |
| 2007/0076289 A1 | 4/2007 | Wang | |
| 2007/0176973 A1 | 8/2007 | Hisanobu | |
| 2007/0188848 A1 | 8/2007 | Machida et al. | |
| 2007/0206270 A1 | 9/2007 | Iwamatsu et al. | |
| 2008/0042926 A1 | 2/2008 | Egi et al. | |
| 2008/0122219 A1 | 5/2008 | Dunnigan et al. | |
| 2008/0174531 A1 | 7/2008 | Sah | |
| 2008/0186259 A1 | 8/2008 | Todorokihara et al. | |
| 2008/0217412 A1 | 9/2008 | Lane | |
| 2008/0292782 A1 | 11/2008 | Lin | |
| 2008/0292978 A1 | 11/2008 | Lin | |
| 2008/0297489 A1 | 12/2008 | Funo et al. | |
| 2008/0297878 A1 | 12/2008 | Brown et al. | |
| 2008/0303782 A1 | 12/2008 | Grant et al. | |
| 2008/0308629 A1 | 12/2008 | Roskind | |
| 2010/0060628 A1 | 3/2010 | Lenssen | |
| 2010/0116894 A1 | 5/2010 | Modica | |
| 2010/0142027 A1 | 6/2010 | Tatsuura et al. | |
| 2010/0248405 A1 | 9/2010 | Tanaka | |
| 2011/0018843 A1 | 1/2011 | Ogawa | |
| 2011/0060640 A1 | 3/2011 | Thompson | |
| 2011/0081527 A1 | 4/2011 | Yamato | |
| 2011/0101111 A1 | 5/2011 | Roncari | |
| 2011/0181532 A1 | 7/2011 | Pan | |
| 2011/0210328 A1 | 9/2011 | Yamazaki et al. | |
| 2011/0254431 A1 | 10/2011 | Hirakawa | |
| 2011/0298760 A1 | 12/2011 | Gila et al. | |
| 2011/0304652 A1 | 12/2011 | Korthuis et al. | |
| 2012/0001889 A1 | 1/2012 | Kimura | |
| 2012/0098419 A1 | 4/2012 | Chiba | |
| 2012/0105370 A1 | 5/2012 | Moore | |
| 2012/0206341 A1 | 8/2012 | Gila et al. | |
| 2012/0274616 A1 | 11/2012 | Scribner et al. | |
| 2012/0274620 A1 | 11/2012 | Hwang | |
| 2012/0320001 A1 | 12/2012 | Gila et al. | |
| 2013/0003162 A1 | 1/2013 | Leoni et al. | |
| 2013/0114124 A1 | 5/2013 | Suwald | |
| 2013/0114126 A1 | 5/2013 | Kim et al. | |
| 2013/0155490 A1 | 6/2013 | Zhang | |
| 2013/0235446 A1 | 9/2013 | Leoni et al. | |
| 2013/0271445 A1 | 10/2013 | Park | |
| 2013/0271820 A1 | 10/2013 | Nakahara | |
| 2013/0315406 A1 | 11/2013 | Choi et al. | |
| 2014/0210805 A1 | 7/2014 | Birecki et al. | |
| 2014/0239068 A1 | 8/2014 | Park | |
| 2014/0253426 A1 | 9/2014 | Leoni et al. | |

FOREIGN PATENT DOCUMENTS

| | | |
|---|---|---|
| JP | 64-085778 A | 3/1989 |
| JP | 01136130 | 5/1989 |
| JP | 04-347667 A | 12/1992 |
| JP | 7179060 | 7/1995 |
| JP | 11010936 | 1/1999 |
| JP | 2001270145 | 10/2001 |
| JP | 2002350905 | 12/2002 |
| JP | 2006-035478 | 2/2006 |
| JP | 2007-033877 A | 2/2007 |
| JP | 2008-149498 | 7/2008 |
| JP | 2010046848 | 3/2010 |

(56) References Cited

FOREIGN PATENT DOCUMENTS

| | | |
|---|---|---|
| JP | 2010069732 | 4/2010 |
| JP | 2011145389 | 7/2011 |
| KR | 20080058956 | 6/2008 |
| KR | 20080064405 | 7/2008 |
| KR | 20080085263 | 9/2008 |
| KR | 10-2008-0109408 | 12/2008 |
| KR | 20130062992 | 6/2013 |
| KR | 20130092934 | 8/2013 |
| WO | WO-2013175212 | 11/2013 |

OTHER PUBLICATIONS

ICFE. "Protect Your Driver's License, Military/Government ID and Credit/Debit Cards with Anti-Electronic Pickpocket Technology Sleeves", Available online at: http://icfe.info/creditCardSleeves.shtml (retrieved from the Internet on Feb. 2, 2012).

Yang et al. "High reflectivity electrofluidic pixels with zero-power grayscale operation", Novel Devices Laboratory, School of Electronics and Computing Systems, University of Cincinnati, Cincinnati, Ohio 45221, USA.

You, H. et al., "Electrowetting on flexible substrates." Journal of Adhesion Science and Technology 26, No. 12-17 (2012): 1931-1939.

\* cited by examiner

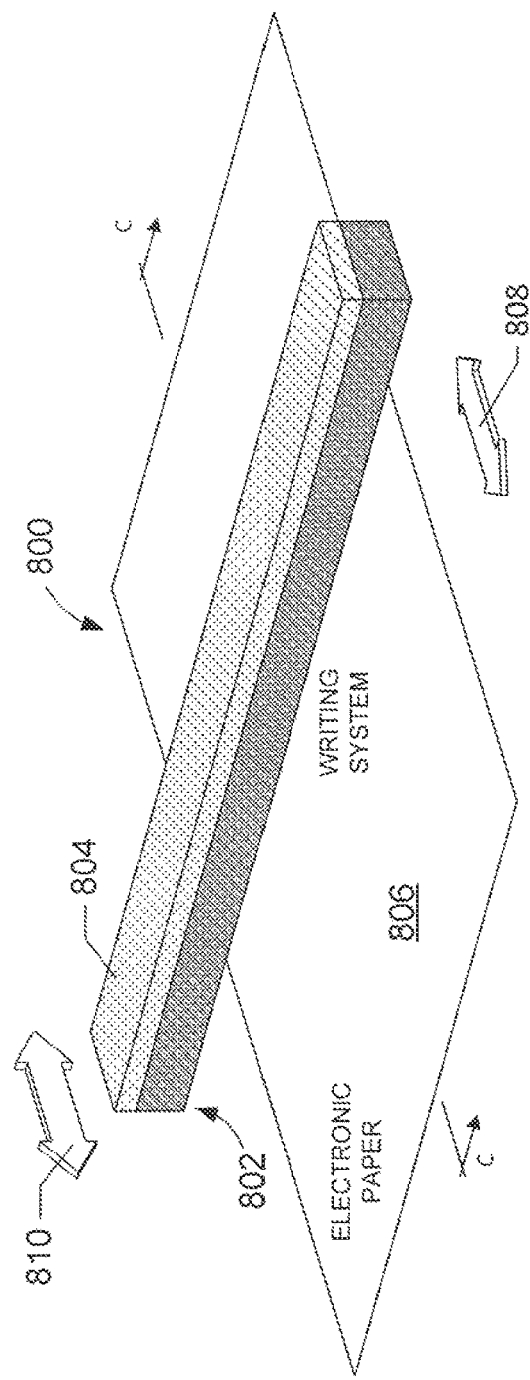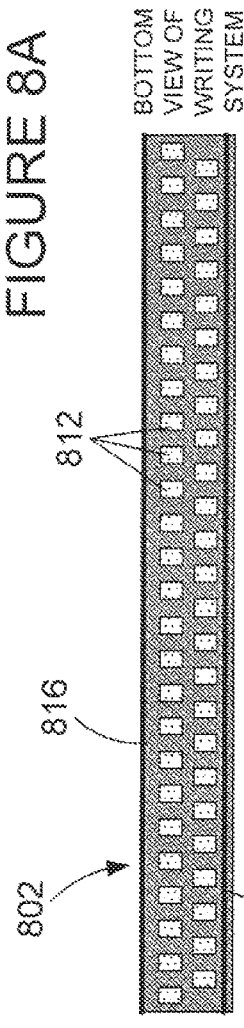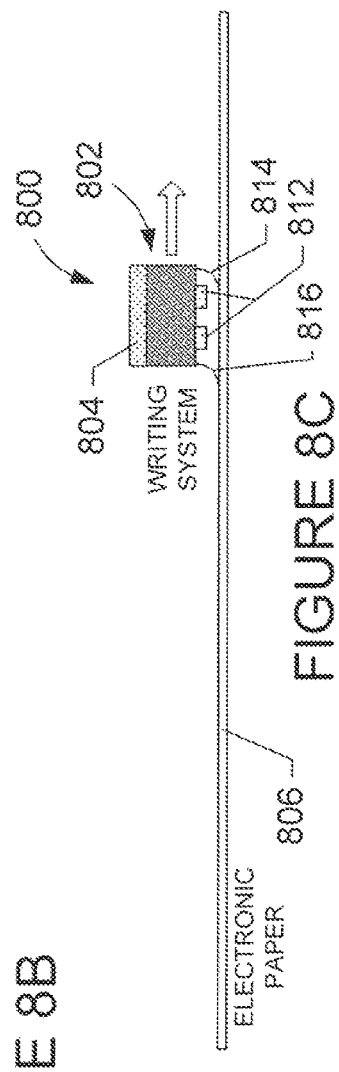

WRITING ELECTRONIC PAPER

CROSS REFERENCE

This application is a Continuation of U.S. patent application Ser. No. 15/664,466, filed Jul. 31, 2017, entitled "WRITING ELECTRONIC PAPER", which is a Continuation of U.S. patent application Ser. No. 12/792,301, filed Jun. 2, 2010, entitled "SYSTEMS AND METHODS FOR WRITING ON AND USING ELECTRONIC PAPER", both of which are incorporated herein by reference.

BACKGROUND

Electronic paper ("e-paper") is a display technology designed to recreate the appearance of ink on ordinary paper. E-paper reflects light like ordinary paper and may be capable of displaying text and images indefinitely without using electricity to refresh the image, while allowing the image to be changed later. E-paper can also be implemented as a flexible, thin sheet, like paper. By contrast, a typical flat panel display does not exhibit the same flexibility, uses a backlight to illuminate pixels, and has to be periodically refreshed in order to maintain the display of an image. Typical e-paper implementations include an e-paper display and electronics for rendering and displaying digital media on the e-paper, such as electronic books ("e-books"). However, the majority of the cost associated with these platforms lies in the electronics used to write on the e-paper, while the cost of the e-paper is considerably less.

Manufacturers and users of display platforms continue to seek cost effective systems and methods for writing on e-paper and a variety of display platforms using e-paper.

BRIEF DESCRIPTION OF THE DRAWINGS

FIGS. 8A-8C show different views of a second example printing system configured in accordance with one or more embodiments of the present invention.

DETAILED DESCRIPTION

Embodiments of the present invention are directed to systems and methods for writing on electronic paper ("e-paper") and display platforms implemented with e-paper. The display platforms included, but are not limited to, cards, posters, general signage, pricing labels, and any other platforms upon which e-paper can be displayed and system and method embodiments of the present invention can be used to write on the e-paper. A general description of the configuration and operation of e-paper is provided in a first subsection. A description of system and method embodiments for writing on e-paper and a description of display platforms implemented with e-paper are provided in a second subsection.

Electronic Paper

Figure 1A:
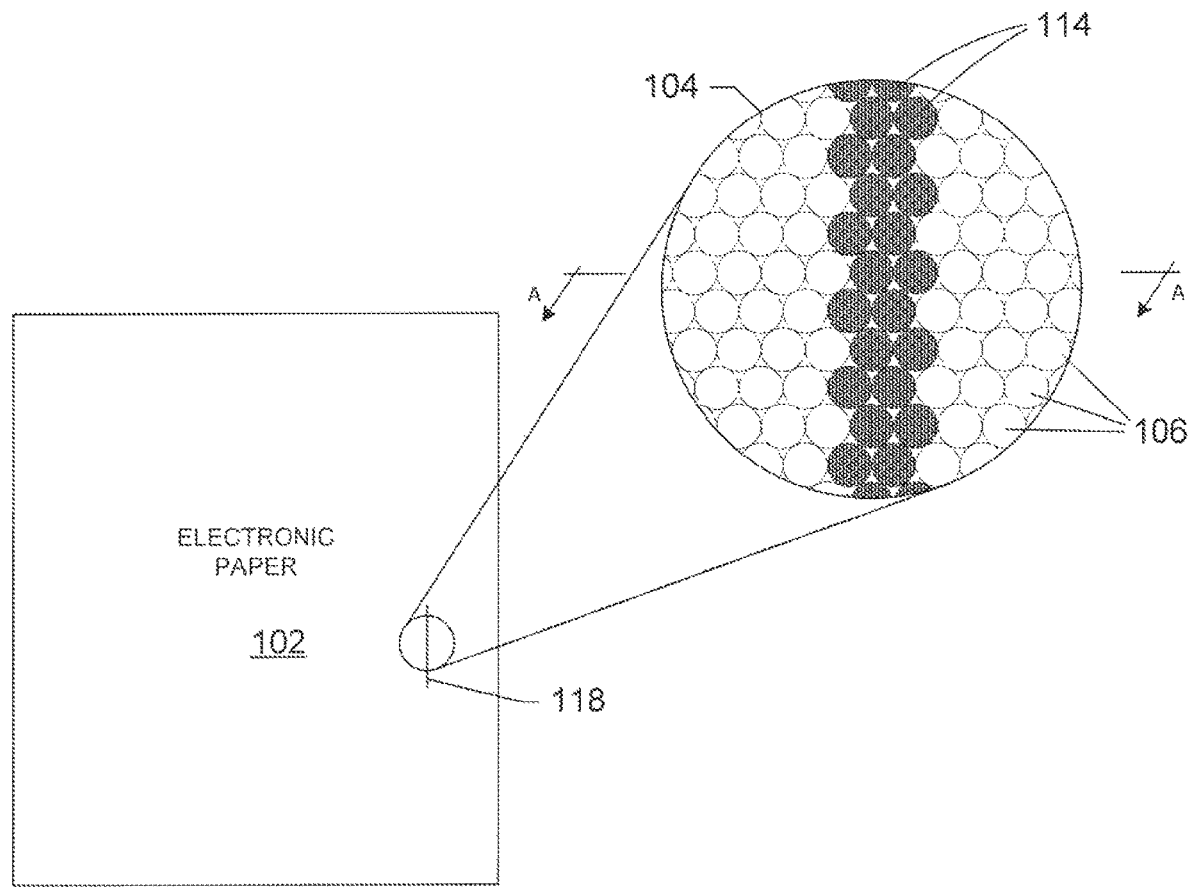
FIG. 1A shows a plan view of an example piece of electronic paper.
Figure 1B:
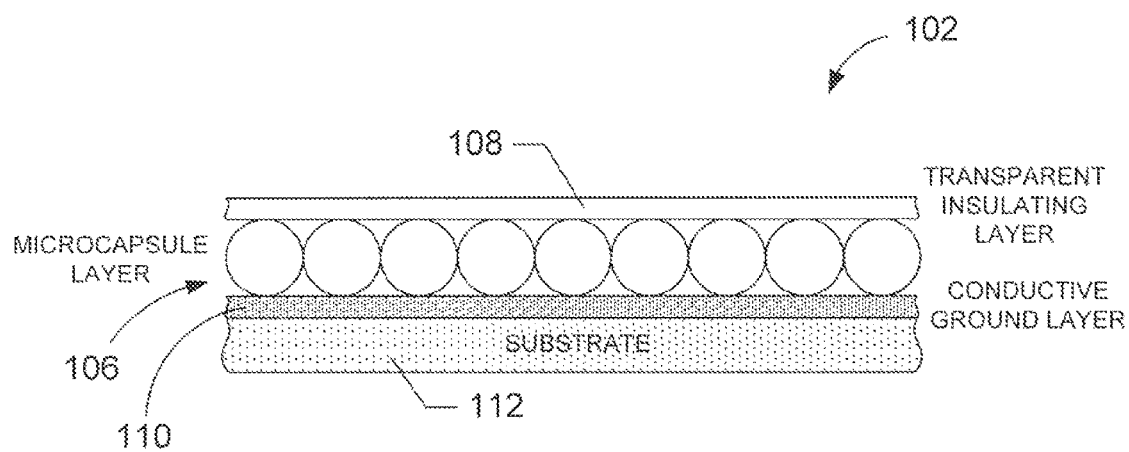
FIG. 1B shows a cross-sectional view of a portion of the electronic paper, shown in FIG. 1A, along a line A-A.

FIG. 1A shows a plan view of an example piece of e-paper 102 and includes an enlargement 104 of a small portion of the e-paper 102. The enlargement 104 reveals the e-paper 102 includes an array of embedded, spherical-shaped microcapsules 106. FIG. 1B shows a cross-sectional view of a portion of the e-paper 102 along a line A-A, shown in FIG. 1A. The cross-sectional view reveals an example multilayer structure of the e-paper 102, including a layer of the microcapsules 106 sandwiched between a transparent insulating layer 108 and a conductive ground layer 110. As shown in FIG. 1B, the conductive ground layer 110 is disposed on a substrate 112. Depending on how the e-paper is used determines the thickness and composition of the various layers. For example, the insulating layer 108 can be composed of a transparent dielectric polymer and can range in thickness from approximately 100 nm to approximately 14 µm. The insulating layer 108 can also be composed of a material that holds charges or is porous or semi-porous to charges and/or ions. The insulating layer 108 can also be composed of a first insulating layer and second patterned conductive layer. The microcapsules, described in greater detail below, can have a diameter of approximately 50 µm, but may also range in diameter from approximately 20 µm to approximately 100 µm. The conductive ground layer 110 can be composed of a transparent conductive material, such as indium tin oxide, or an opaque conductive material and can have a thickness ranging from approximately 5 nm to approximately 1 mm. Typically, the layers 106, 108, and 110 have a total thickness of approximately 100 µm. The substrate 112 can be composed of an opaque material or a transparent material and can range in thickness from approximately 20 µm to approximately 1 mm, or the thickness can be much larger depending on the how the e-paper is used. For example, the substrate 112 can be composed of polyester, plastic, or transparent Mylar. Also, the substrate 112 can be omitted and the layers 106, 108, and 110 can be mounted on a wall or a product chassis.

Ideally the insulating layer 108 serves as a wear protection layer for the layer of microcapsules 106 and normalizes the e-paper surface, eliminating surface topography and blocking surface conduction paths on the microcapsule surfaces. A variation on e-paper 102 includes the layer of microcapsules 106, the ground layer 110, and the substrate 112, but the insulating layer 108 can be omitted.

The microcapsules 106 can be filled with one or more pigment particles that can be used to display images by looking at the e-paper 102 from the insulating layer 108 side, although typical e-paper is viewed through the substrate layer 112. For example, returning to FIG. 1A, the microcapsules 106 in the microcapsule layer can be configured with white and black particles. Each microcapsule can form a black and white pixel or groups of adjacent microcapsules can form a black and white pixel. When white particles of a microcapsule are located near the insulating layer 108 the microcapsule appears white to a viewer, and when the black particles of a microcapsule are located near the insulating layer 108 the microcapsule appears black to the viewer. For example, enlargement 104 shows a thin vertical line 118 displayed in the e-paper 102 by a number of microcapsules 114 with black particles located near the insulating layer 108 surrounded by microcapsules 106 with white particles located near the insulating layer 108. The microcapsules 106 are designed to exhibit image stability using chemical adhesion between particles and/or between the particles and the microcapsule surface. For example, the black and white microcapsules ideally can hold text and images indefinitely without drawing electricity, while allowing the text or images to be changed later.

Figure 2A:
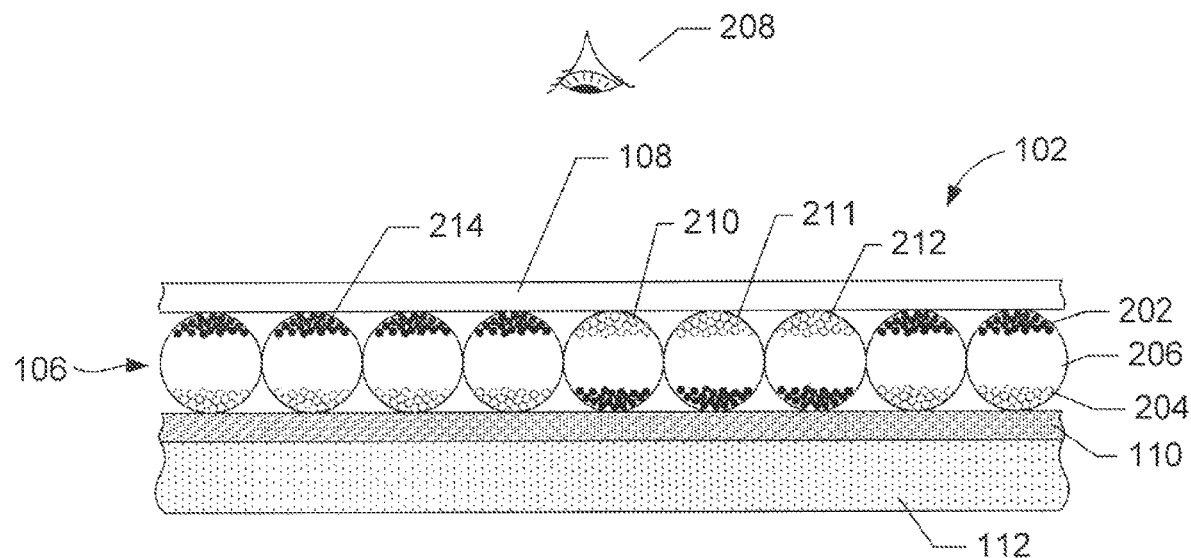
FIGS. 2A-2D show four examples of microcapsule implementations of electronic paper.

FIGS. 2A-2D show four examples of microcapsule implementations of e-paper. In the example of FIG. 2A, each microcapsule includes black particles 202 and while particles 204 suspended in a transparent fluid 206. The particles can be of opposite charges. For example, the black particles 202 can be positively charged particles and the white particles 204 can be negatively charged particles. One or more microcapsules form a pixel of black and white images displayed on the e-paper 102. The black and white images are created by placing white or black particles near the insulating layer 108. For example, the microcapsules 210-212 with white particles located near the transparent insulating layer 108 reflect white light and appear white to a viewer 208. By contrast, the microcapsules with black particles located near the transparent insulating layer 108, such as microcapsule 214, appear black to the viewer 208, corresponding to a black portion of the image displayed on the e-paper 102. Various shades of gray can be created by varying the arrangement of alternating microcapsules with white and black particles located near the insulating layer 108 using halftoning.

Figure 2B:
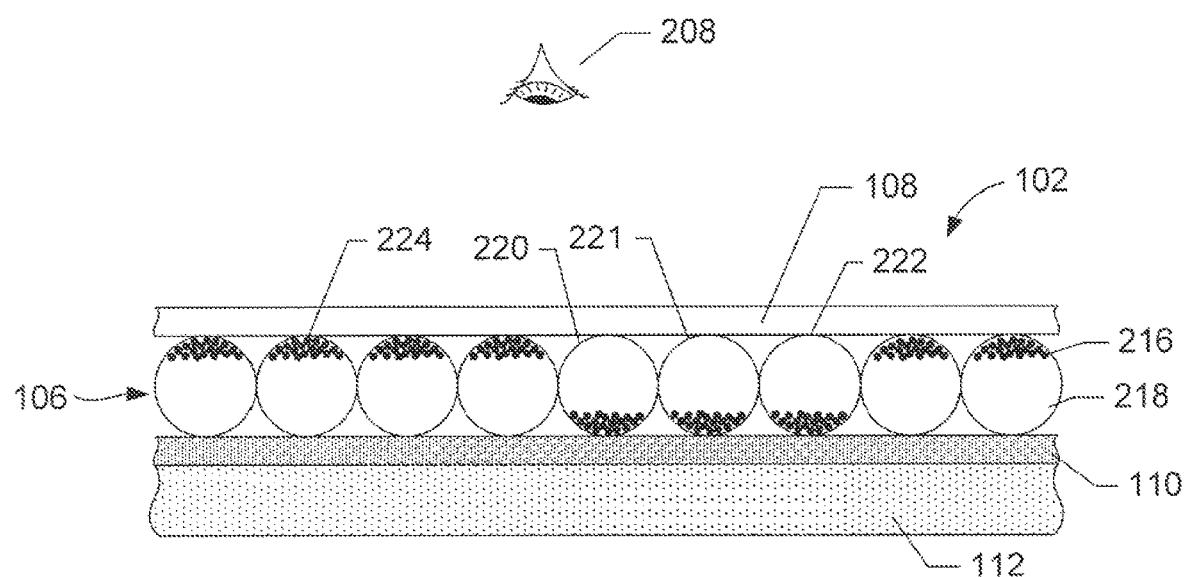

In the example of FIG. 2B, each microcapsule includes black particles 216 suspended in a white colored fluid 218. The black particles 216 can be positively charged particles or negatively charged particles. One or more microcapsules form a pixel of black and white images displayed on the e-paper 102. The black and white images are created by placing black particles near or away from the insulating layer 108. For example, the microcapsules 220-222 with black particles located away from the transparent insulating layer 108 reflect white light, corresponding to a white portion of an image displayed on the e-paper 102. By contrast, the microcapsules with black particles located near the transparent insulating layer 108, such as microcapsule 224, appear black to the viewer 208, corresponding to a black portion of the image displayed on the e-paper 102. Various shades of gray can be created by varying the arrangement of alternating microcapsules with black particles located near or away from the insulating layer 108 using halftoning.

Figure 2C:
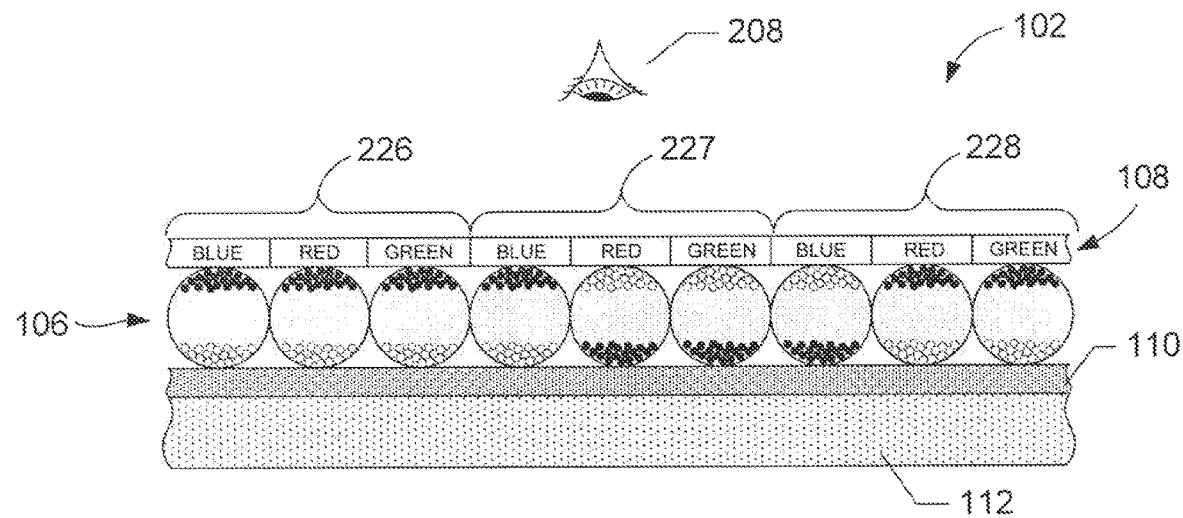

In the example of FIG. 2C, the e-paper 102 is configured as described above with reference to FIG. 2A, except the insulating layer 108 is configured with alternating blue, red, and green regions. Adjacent blue, red, and green regions form color pixels, such as color pixels 226-228. Color images are created by placing different combinations of white or black particles near the insulating layer 108. For example, the microcapsules of color pixel 227 with white particles located near the red and green regions of the transparent insulating layer 108 reflect red and green light from the e-paper which appear in combination as a yellow pixel of a color image observed by the viewer 208. The microcapsules of color pixel 226 have black particles located near the transparent insulating layer 108 causing the color pixel 226 to appear black to the viewer 208. Only one microcapsule of color pixel 228 has white particles located near the blue region of the transparent insulating layer 108 reflecting blue light from the e-paper. The insulating layer 108 may also use other primary colors to create color images such as regions with yellow, magenta, and cyan. The insulating layer 108 may also includes spot colors, such as colors associated with a logo.

Figure 2D:
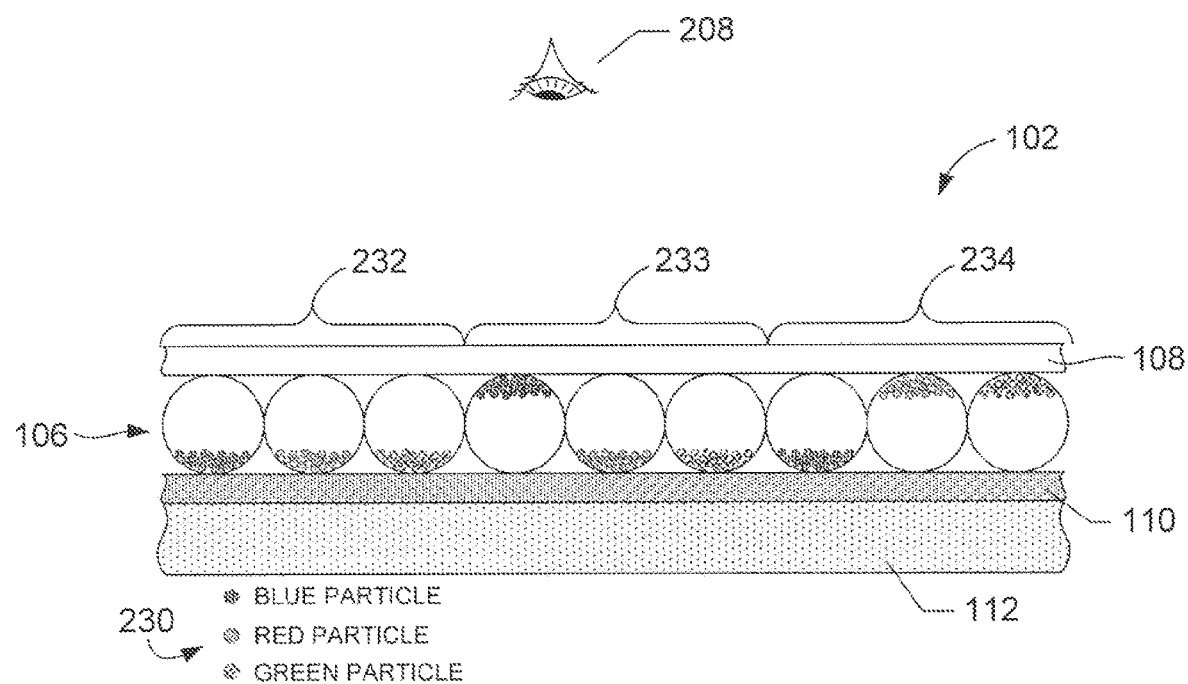

In the example of FIG. 2D, the e-paper 102 is configured as described above with reference to FIG. 2B, except the black particles of each microcapsule are replaced by either blue, red, or green positively, or negatively, charged particles, represented by differently shaded particles in legend 230. Microcapsules with adjacent blue, red, and green particles form color pixels, such as color pixels 232-234. Color images are created by placing different combinations of colored particles near the insulating layer 108. For example, the microcapsules of color pixel 234 with red and green particles located near the insulating layer 108 reflect red and green light from the e-paper which appear in combination as a yellow pixel of a color image observed by the viewer 208. The microcapsules of color pixel 232 have colored particles located away from the insulating layer 108 causing the color pixel 232 to appear white to the viewer 208. Only one microcapsule of color pixel 233 has red particles located near the insulating layer 108 reflecting red light from the e-paper.

The e-paper 102 and variations shown in FIGS. 2A-2D represent only a handful of many different varieties of e-paper that is suitable for use with the electronic paper writing systems and methods of the present invention. Other types of e-paper include electrophoretic paper, field induced displays, or any other display surface activated by an electrical field directed substantially perpendicular to the display surface.

For the sake of simplicity and brevity, writing systems and method embodiments are described using the e-paper described above with reference to FIG. 2A. However, writing systems and methods are not intended to be limited in their application. The writing systems and methods can be used to write to any type of e-paper, including any of the kinds of e-paper described above in the preceding subsection.

Figure 3:
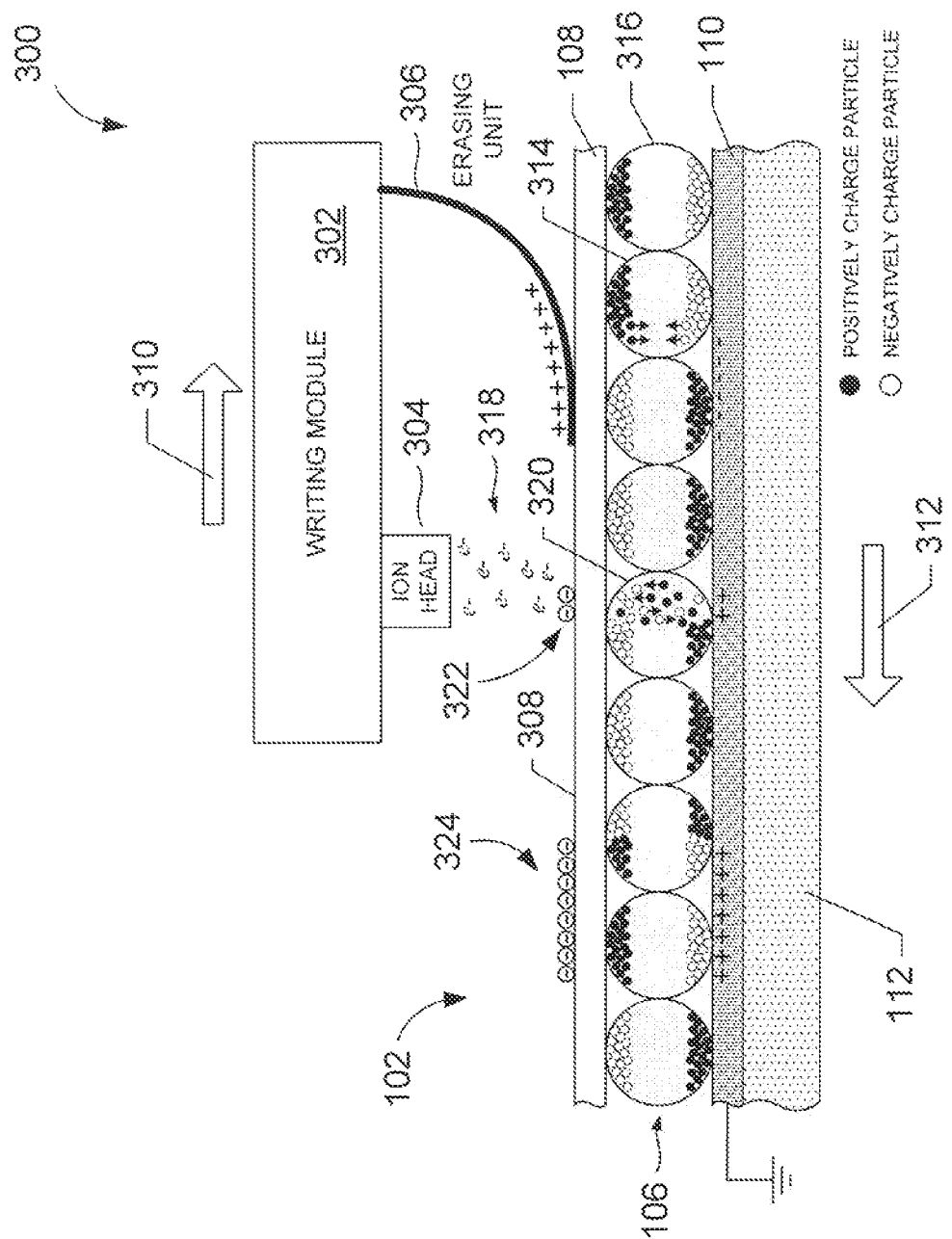
FIG. 3 shows a side view and schematic representation of a first example writing system configured in accordance with one or more embodiments of the present invention.

FIG. 3 shows a side view and schematic representation of an example writing system 300. The writing system 300 includes a writing module 302, writing unit 304, and an erasing unit 306. The writing unit 304 and erasing unit 306 are connected to the same side of the writing module 300 that faces the outer surface 308 of the insulating layer 108, with the ion head 304 suspended above the surface 308. In the example of FIG. 3, the writing unit 304 is an ion head and the erasing unit 306 can be an electrode that comes into close contact with, or can be dragged along, the surface 308 in front of the ion head 304. The writing module 302 can be moved in the direction 310 and the e-paper held stationary; or the e-paper 102 can be moved in the direction 312 and the writing module 302 held stationary; or the writing module 302 is moved in the direction 310 and the e-paper 102 is simultaneously moved in the opposite direction 312.

In the example shown in FIG. 3, the black particles and the white particles of the microcapsules are positively charged and negatively charged, respectively. The erasing unit 306 erases any information stored in the microcapsules prior to writing information with the ion head 304. In the example shown in FIG. 3, as the e-paper 102 passes under the writing module 302, the positively charged erasing unit 306 can remove negatively charge ions attached to the surface 308. The positively charge erasing unit 306 also creates electrostatic forces that drive positively charged black particles away from the insulating layer 108 and attract negatively charged white particles toward the insulating layer 108. For example, as shown in FIG. 3, as the positively charged erasing unit 306 passes over the surface 308 and approaches microcapsule 314, positively charged black particles of the microcapsule 314 are repelled by the positive charge and driven away from the insulating layer 108. By contrast, negatively charged white particles are attracted to the erasing unit 306 and driven toward the insulating layer 108. When the erasing unit 306 reaches the microcapsule 316, the white and black particles of the microcapsule 314 are reversed and the microcapsule 314 reflects white light.

FIG. 3 also reveals the writing operation performed by the ion head 304. In certain embodiments, the ion head 304 can be implemented as described in U.S. Pat. No. 7,623,144, issued Nov. 24, 2009 to Hewlett-Packard Development Company, L.P. The ion head 304 is configured and operated to selectively eject electrons, e−, 318 toward the insulating layer 108, when a region of the e-paper located beneath the ion head 304 is to be changed from white to black. As the electrons reach the surface 308, the negatively charged white particles are repelled and driven away from the insulating layer 108, while the positively charged black particles are attracted to the negatively charged electrons and driven toward the insulating layer 108. For example, as shown in FIG. 3, as the ion head 304 passes over a portion of microcapsule 320 while ejecting electrons, the negatively charged white particles are repelled away from the insulating layer 108 and the positively charged black particles are driven toward the insulating layer 108. The electrons 318 can be absorbed by the insulating layer 108 over the regions that are to written to, or the electrons 318 can create ions that are absorbed by adhesion forces to the surface 308. In the case where ions are formed, it is believed that as the electrons 314 are ejected from the ion head 304, the electrons interact with certain air molecules to form negatively charge molecular ions 322 that attach to the surface 308. For example, it is believed that carbon dioxide in the air gap between the ion head 304 and the surface 308 interacts with the ejected electrons to form a negatively charged carbon dioxide ion that attaches to the surface 308.

Embodiments of the present invention are not limited to the ion head 304 discharging electrons and the erasing unit 306 erasing information with positive charges. The microcapsules 106 of the microcapsule layer can be composed of negatively charged black particles and positively charged white particles. In other embodiments, the ion head 304 can be configured to produce positively charged ions, which are absorbed to the surface 308, and the erasing unit 306 can use negative charges to erase information stored in the microcapsule layer of the e-paper 102. In other embodiments, the writing unit can be any charge injection device with sufficient addressability and resolution. For example, the writing unit can be a plasma generating needle.

The negatively charged molecular ions attached to the surface 308 may help to preserve information written to the e-paper 102. For example, FIG. 3 shows negatively charged molecular ions 324 attached to the surface 308. The negatively charged ions 324 maintain the positively charged black particles located near the insulating layer 108 and the negatively charged white particles located away from the insulating layer 108, preserving the information written to the e-paper 102.

When the e-paper 102 is handled by a person after writing, moisture, oils from the person's hands, and static electricity or tribo charges carried by the person may alter the charge distribution over the surface 308 or inside the layer 108. These charges may be large enough to cause a redistribution of white and black particles in microcapsules. For example, the negatively charged ions may be moved along the surface 308 switching portions or entire microcapsules from white to black. In order to prevent image distortion due to tribo charges, or other charge changing factors, which might occur due to handling, the particles, the fluid filling the microcapsules 106, and the insulating layer 108 can be designed to only move for charges and particles with a magnitude exceeding the magnitude of the charges associated with handling. For example, the e-paper 102 could be designed so that charges and charged particles attached to the surface 308 or inside the layer 108 are redistributed with charges and electrical fields that can only be generated during the writing phases.

Figure 4A:
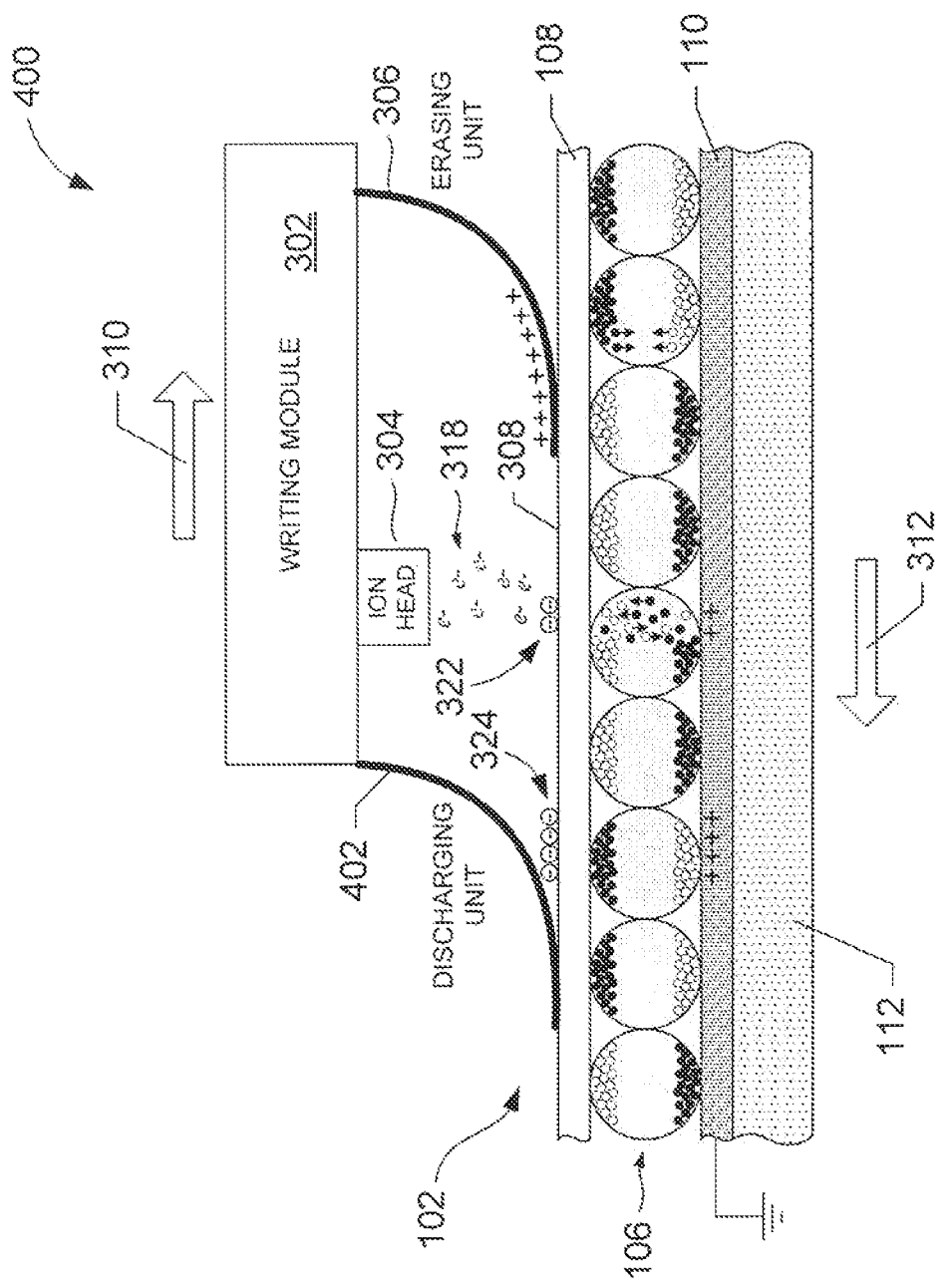
FIGS. 4A-4B show a side view and a schematic representation of a second example writing system configured in accordance with one or more embodiments of the present invention.

In other embodiments, writing systems can also be configured with a discharging unit that removes ions from the surface 308 after the ion head 304 has been used to write information into the layer of microcapsules 106. The discharging unit can be an active or a passive contact device that removes positive or negative charges from the surface 308. For example, the discharging unit 402 can be composed of carbon conductive plastic or a conductive rubber and operated so that charges jump from the surface 308 onto the discharge unit. FIG. 4A shows a side view and schematic representation of an example writing system 400. The writing system 400 is similar to the writing system 300 described above except the writing system 400 includes a discharging unit 402 connected to the same side of the writing module 300 that faces the outer surface 308 of the insulating layer 108. As shown in the example of FIG. 4, the discharging unit 402 can be a passive or active device that is dragged behind the ion head 304 along the surface 308. The discharging unit 402 removes negatively or positively charged ions or charges from the surface 308 thereby reducing the likelihood that during handling of the e-paper 102 ions are redistributed on the surface 308 causing a redistribution of white and black particles in microcapsules. For example, FIG. 4A shows a snapshot of the negatively charged molecular ions 324 attached to the surface 308 after information is written to the microcapsules 404 and 406 being removed from the surface 308 by the discharging unit 402. In certain embodiments, a passive discharging unit 402 can be a rubber material that touches the surface 308 as the e-paper 102 passes under the writing system 400.

Figure 4B:
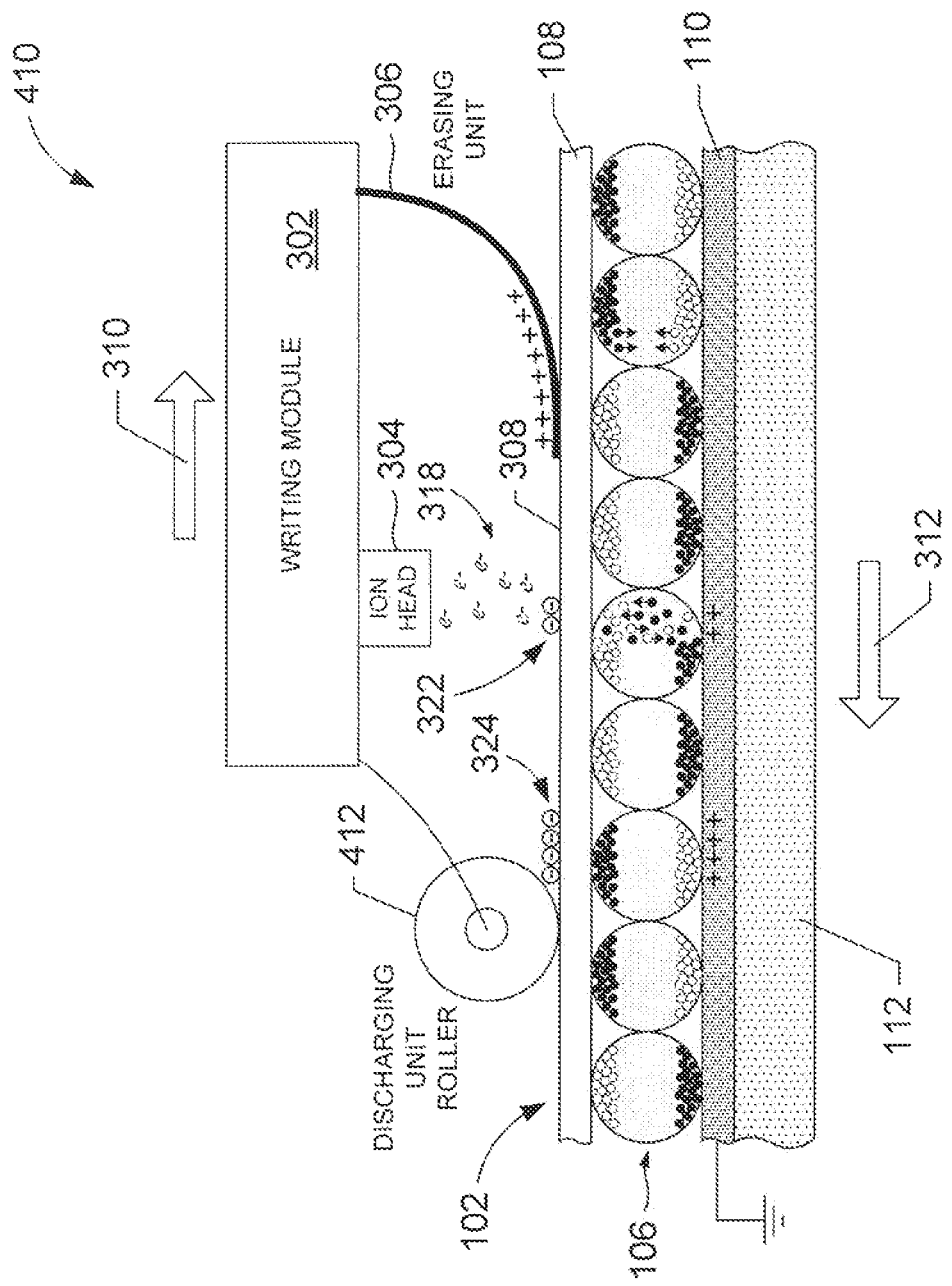

In other embodiments, an active discharging unit 402 can be a charged roller composed of a conductive rubber that removes charges from the surface 308 as the roller passes over the surface 308. FIG. 4B shows a side view and schematic representation of an example writing system 410.

The writing system 410 is similar to the writing system 400 except the discharging unit 402 is a charged roller 412 that removes charges from the surface 308.

Figure 5:
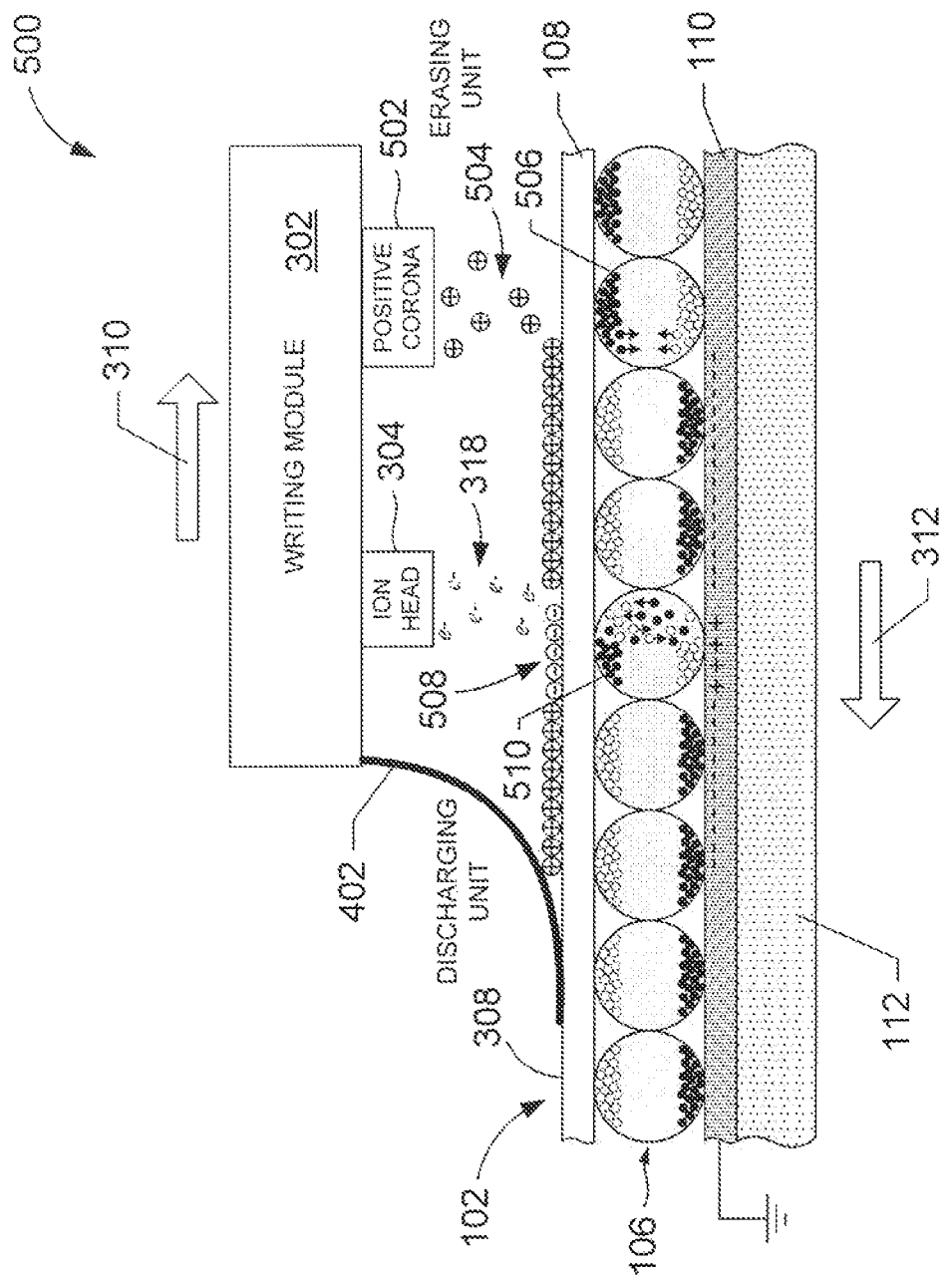
FIG. 5 shows a side view and schematic representation of a third example writing system configured in accordance with one or more embodiments of the present invention.

In other embodiments, the erasing unit 306 of the writing systems 300 and 400 can be replaced by an AC or DC operated corona. FIG. 5 shows a side view and schematic representation of an example writing system 500. The writing system 500 is similar to the writing system 400 except the erasing unit 306 is replaced with a corona 502. In the example of FIG. 5, the corona 502 is configured to generate a plasma of positively charged ionic species that migrate onto the surface 308 by converting naturally occurring gaseous molecules and atoms located in the air gap between the corona 502 and the surface 308 into positively charged ions that are deposited onto the surface 308. For example, in certain embodiments, the corona 502 can be configured to convert naturally occurring nitrogen ("$N_2$") located in the air gap between the corona 502 and the surface 308 into positively charged nitrogen gas ions ("$N_2^+$") that are deposited onto the surface 308. In other embodiments, the writing module can be configured to inject molecules or atoms, such as $N_2$ or argon ("Ar"), into the corona 502, which in turn converts the charge neutral molecules or atoms into positively charged ions that are deposited onto the surface 308.

FIG. 5 also shows a snapshot of the e-paper 102 passing under the corona 502 as positively charged ions 504 generated by the corona 502 migrate and are deposited onto the surface 308. As represented in microcapsule 506, the positively charged ions attach to the surface 308 and create repulsive electrostatic forces that drive the positively charged black particles away from the insulating layer 108 and create attractive electrostatic forces that drive negatively charged white particles toward the insulating layer 108, erasing information contained in microcapsule 506. The ion head 304 is operated to selectively write information into microcapsules by ejecting electrons 318 that change the ions deposited on the surface 308 from positively charged ions into negatively charged ions 508. For example, FIG. 5 shows a snapshot of information being written to microcapsule 510. The negatively charged ions 508 attached to the surface 308 create repulsive electrostatic forces that drive the negatively charged white particles away from the insulating layer 108 and create attractive electrostatic forces that drive positively charged black particles toward the insulating layer 108. After information is written to the microcapsules, the e-paper 102 continues to pass under the discharging unit 402, which removes the negatively and positively charged ions from the surface 308.

In other embodiments, the corona 502 described above with reference to FIG. 5 can be used as a discharging unit 402. For example, the discharging unit represented by the roller 412, shown in FIG. 4B, can be replaced by an AC or DC operated corona that generates a plasma of an appropriate charge for removing charges or ions attached to the surface 308.

For the sake of simplicity, the writing unit is described above as having only one ion head, but embodiments of the present invention are not intended to be so limited. In practice, writing system embodiments can be implemented with two or more ion heads. The ion heads can also be used to erase and write information to the e-paper. For example, a first ion head can be operated as an erasing unit and a second ion head can be operated as described above to write information to the e-paper. In still other embodiments, the ion head 304 can be replaced by one or more needles operated to supply a charge of an appropriate magnitude for writing information to the microcapsule layer.

Figure 6A:
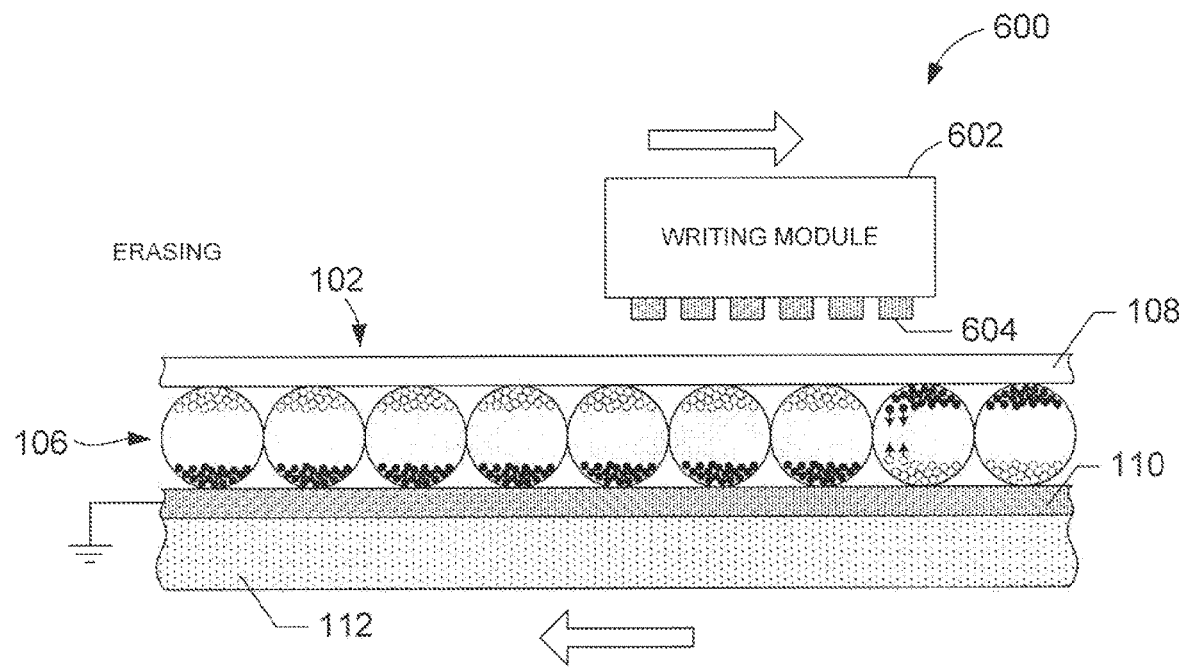
FIGS. 6A-6C show side views of three writing systems configured in accordance with one or more embodiments of the present invention.
Figure 6B:
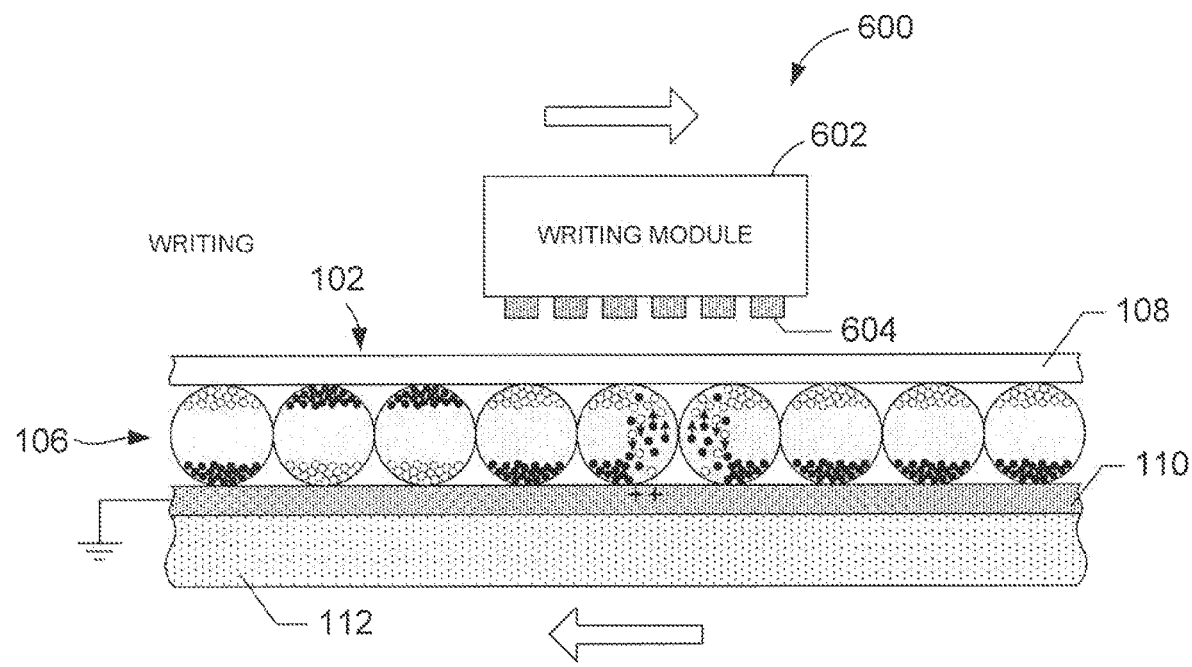

Writing system embodiments also include writing modules with an array of electrodes that face the surface 308 of the e-paper 102 and are used to erase information in a first pass of the e-paper and in a second pass of the e-paper the electrodes can be selectively operated to write information to the e-paper 102. FIGS. 6A-6B show side views of a writing system 600. The writing system 600 includes a writing module 602 and a one-dimensional or two-dimensional array of electrodes 604. Each electrode in the array of electrodes can be individually operated in order to selectively erase and writing information to the e-paper. The writing system 600 is oriented so that the electrodes face the surface 308 of the e-paper 102. The writing system 600 can be operated by first erasing the information stored in the e-paper followed by a second pass that selectively writes information to the e-paper 102. In FIG. 6A, the writing system is operated to erase information stored in the microcapsule layer by supplying a positive charge that drives positively charge black particles away from the insulating layer 108 and drives negatively charged white particles toward the insulating paper 108. In FIG. 6B, the writing system is operated to selectively write information into the layer of microcapsule 106 by supplying a negative charge that attracts positively charge black particles toward the insulating layer 108 and drives negatively charged white particles away from the insulating paper 108. In other embodiments, the writing module 602 can include an erasing unit 306 and the array of electrodes 604 can be operated to write information to the e-paper.

Figure 6C:
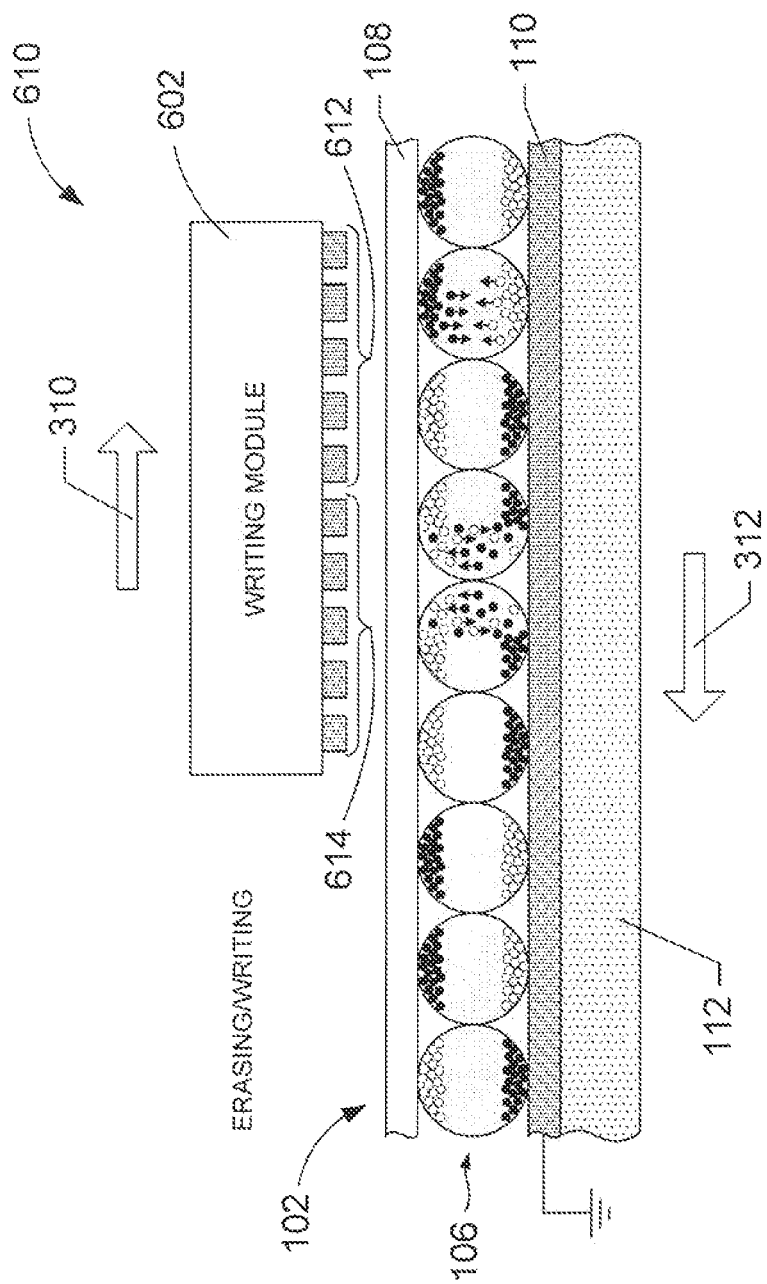

Writing systems also include writing modules with an array of electrodes that can erase and write in a single pass. A portion of the electrodes can be dedicated to erasing while another portion of the electrodes can be dedicated to writing information to the e-paper. FIG. 6C shows a side view of a writing system 610. The writing system 610 includes the writing module 602 and a one-dimensional or two-dimensional array of individually addressable electrodes 604. As shown in FIG. 6C, a first portion of the electrodes 612 is operated to erase information stored in the layer of microcapsules 106, and a second portion of the electrodes 614 is operated to write information to the layer of microcapsules 106. Note that direction of motion can be sensed, and the operation of the electrodes 604 can be dynamically changed to reduce motion direction sensitivity.

In other embodiments, the two-dimensional array of individually addressable electrodes can be dimensioned to substantially match the dimensions of the e-paper, enabling the array of electrodes to erase and write to the entire e-paper without scanning. For example, the two-dimensional array of electrodes engages or contacts the e-paper perpendicular to the e-paper surface using a solenoid motor or other mechanical system.

The microcapsules 106 of the microcapsule layer can also be composed of negatively charged black particles and positively charged white particles. In other embodiments, the writing system is operated to erase information stored in the microcapsule layer by supplying a negative charge that drives negatively charge black particles away from the insulating layer 108 and attracts positively charged white particles toward the insulating paper 108, and the writing system is operated to selectively write information into the microcapsule layer by supplying a positive charge that attracts negatively charge black particles toward the insulating layer 108 and drives positively charged white particles away from the insulating paper 108.

Figure 7A:
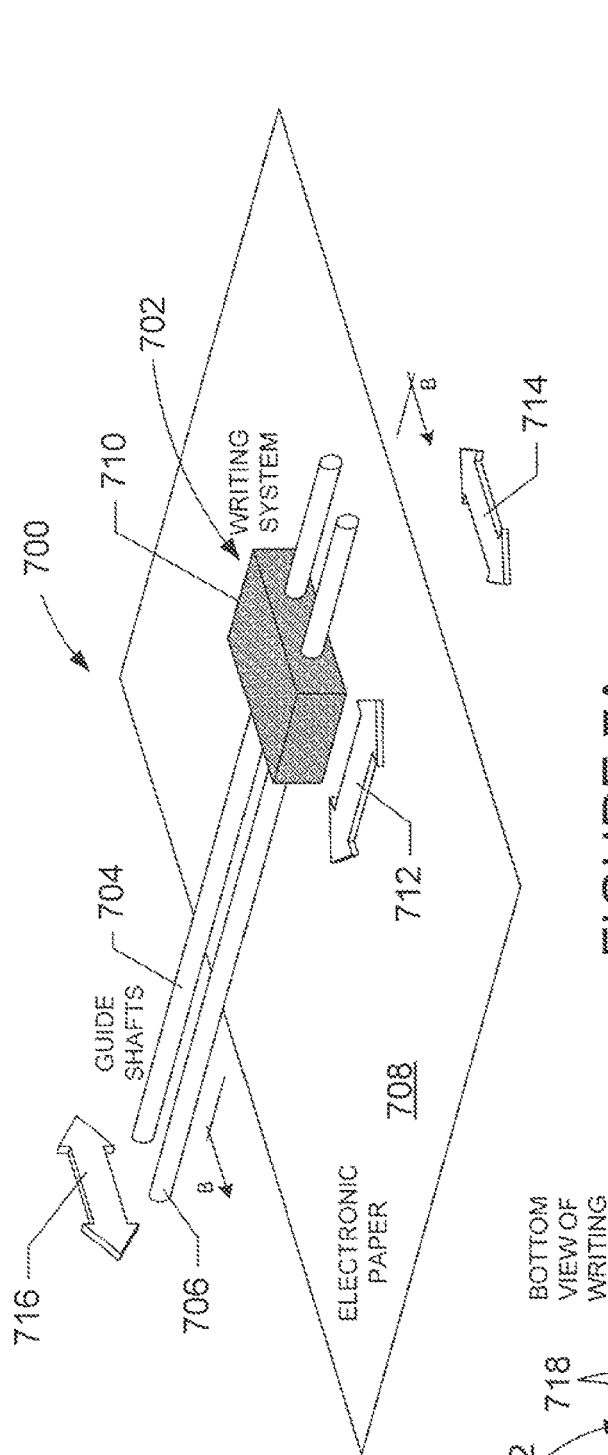
FIGS. 7A-7C show different views of a first example printing system configured in accordance with one or more embodiments of the present invention.

The writing systems described above can be implemented in various kinds of printing systems. FIG. 7A shows an isometric view of an example printing system 700. The printing system 700 includes a writing system 702 mounted on two guide shafts 704 and 706 extending parallel to each other. The writing system 702 is oriented with the erasing unit, ion heads, and discharging unit pointed toward e-paper 708. In the example shown in FIG. 7A, the shafts 704 and 706 extend through the writing module portion of the writing system 702. The writing system 702 can be moved along the shafts 704 and 706 using a circular belt (not shown) attached to the writing module 710 and is driven by a motor (not shown). The writing system 702 is used to write information to the e-paper by raster scanning the writing system 702 back and forth as the writing system 702 is moved along the length of the e-paper 708. The writing system 702 moves back and forth along the shafts 704 and 706 as indicated by directional arrow 712. In certain embodiments, the printing system can be implemented by mounting the shafts 704 and 706 in a housing that holds the shafts 704 and 706 stationary while the e-paper 708 passes under the writing system 702 using a printer carriage (not shown) as indicated by directional arrow 714. In other embodiments, the e-paper can be held stationary while the shafts 704 and 706 are moved along the length the e-paper, as indicated by directional arrow 716.

Figure 7B:
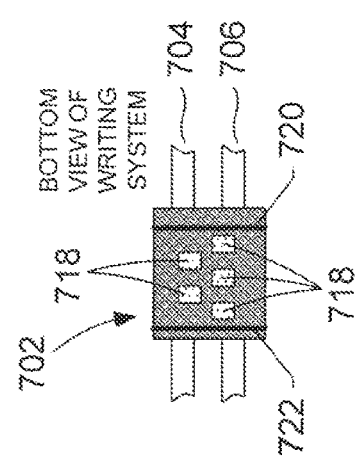

FIG. 7B shows a bottom view of the example writing system 702 revealing the writing system 702 is composed of a staggered arrangement of five separate ion heads 718 used to write information into the e-paper 708 as described above with reference to FIGS. 3-5. The writing system 702 also includes an erasing unit 720, as described above with reference to FIGS. 3 and 4, and includes a discharging unit 722, as described above with reference to FIG. 4.

Figure 7C:
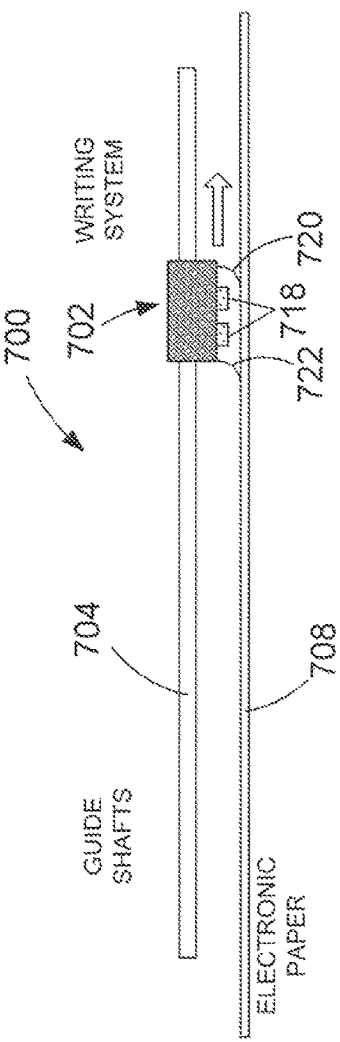

FIG. 7C shows a cross-sectional view of the printing system 700 in operation along a line B-B, shown in FIG. 7A. The writing system 702 is moved along the shafts 704 and 706 as the erasing unit 720, ion heads 718, and discharging unit 722 are operated to write information into the e-paper 708, as described above with reference to FIGS. 3-4. In other embodiments, the erasing unit can be a corona, as described above with reference to FIG. 5.

FIG. 8A shows an isometric view of an example printing system 800. The printing system 800 includes a writing system 802 attached to a guide 804, both of which extend the width of e-paper 806. The writing system 802 is oriented with the erasing unit, ion heads, and discharging unit pointed toward e-paper 806. The writing system 802 is configured to write information to the e-paper 806 in a single pass. In certain embodiments, the e-paper 806 passes under the writing system 802 using a printer carriage (not shown) as indicated by directional arrow 808. In other embodiments, the e-paper 806 can be held stationary while the writing system 802 is moved back and forth using a mechanized platform connected to the guide 804, as indicated by directional arrow 810.

FIG. 8B shows a bottom view of the example writing system 802 revealing the writing system 802 composed of an arrangement of separate ion heads 812 that extend the length of the writing system 802. The arrangement of ion head 812 write information into the e-paper 806 in a single pass, as described above with reference to FIGS. 3-5. The writing system 802 also includes an erasing unit 814, as described above with reference to FIGS. 3 and 4, and includes a discharging unit 816, as described above with reference to FIG. 4.

FIG. 8C shows a cross-sectional view of the printing system 800 in operation along a line C-C, shown in FIG. 8A. As the writing system 802 moves along the e-paper 806, the erasing unit 814, ion heads 812, and discharging unit 816 write information into the e-paper 806 as described above with reference to FIGS. 3-4. In other embodiments, the erasing unit can be a corona, as described above with reference to FIG. 5.

The printing systems described above enable e-paper to be implemented in a variety of different non-electronic-based display platforms. For example, the paper 608 and 806 can be used in a variety of different media, including posters, general signage, pricing labels, e-books. In other embodiments, the display platform can be a card configured with one or more e-paper strips. The cards can be composed of a polyester, a plastic, or transparent Mylar in order to provide a substrate for the one or more e-paper strips, as described above with reference to FIGS. 1-2.

Figure 9A:
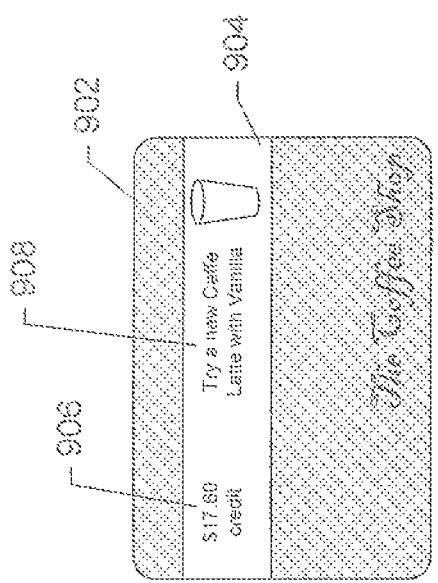
FIGS. 9A-9B show examples of cards configured with a strip of e-paper for displaying information in accordance with one or more embodiments of the present invention.
Figure 9B:
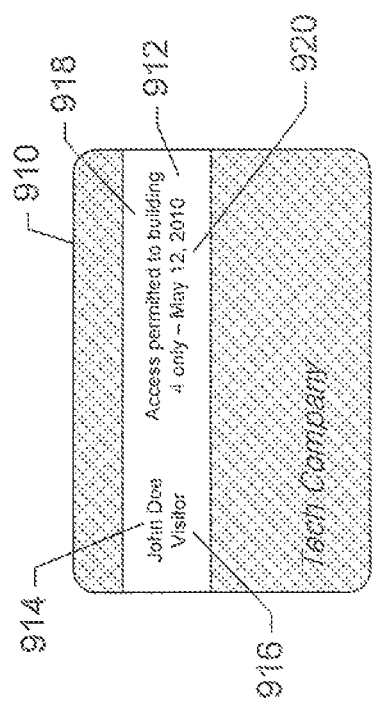

FIGS. 9A-9B show just two examples of cards, each card configured with a strip of e-paper for displaying information. In the example of FIG. 9A, a card 902 can be a gift card or a card issued to customers of a business, such as a department store. The card 902 includes an e-paper strip 904 and may include barcode or magnetic strip located on the back of the card (not shown), which is read by an electronic card machine. The card 902 can be issued value when the card 902 is sold to a customer. This value can be stored on the card magnetic strip and/or stored in the business's database, which is linked to the card 902 identification number. When the card 902 is issued and/or used, the amount can also be written on the e-paper strip 904. For example, as shown in FIG. 9A, the card 902 is sold by a business called "The Coffee Shop." When the customer uses the card 902 to complete a transaction at The Coffee Shop, the amount on the card is debited accordingly and the remaining amount of credit available 906 on the card is stored in the business's database and is written to the e-paper strip 904. In this way the customer does not have to remember the amount available on the card after each purchase. Instead, the amount available on the card is displayed on the e-paper strip 904 after each purchase. As shown in the example of FIG. 9A, the e-paper strip 904 can also be used to display advertisements 908 or any other information.

In the example of FIG. 9B, a card 910 can be a security card issued by a company or a government agency that wants to limit a visitor's access to certain buildings or departments. The card 910 includes an e-paper strip 912. When the card is issued to the wearer, the wearer's name and any other relevant information can be written on the e-paper strip 912, so that the wearer's access can be readily checked simply by reading the information displayed on the e-paper strip 912. For example, the e-paper strip 912 includes the wearer's name 914, identifies the wearer as a visitor 916, indicates which building 918 the wearer has access to, and the date 920 on which the wearer has access.

Display platforms are not intended to limited to the cards shown in FIGS. 9A-9B. The cards 902 and 910 are intended to represent just two of the many different kinds of uses for cards configured with one or more e-paper strips.

Figure 10:
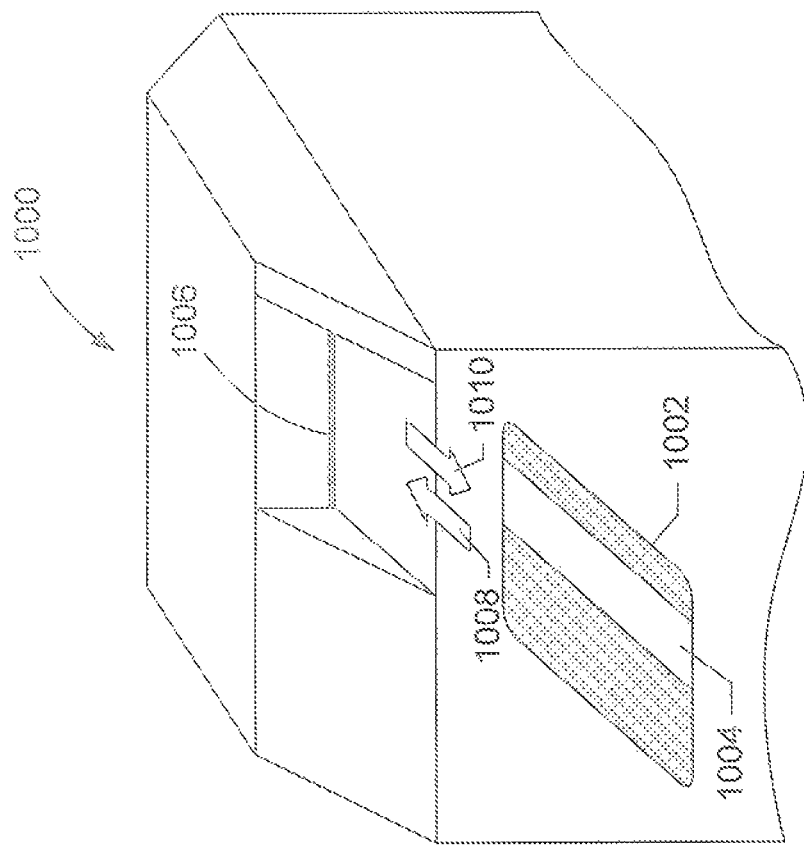
FIG. 10 shows an isometric view of an electronic paper writing machine and a card configured in accordance with one or more embodiments of the present invention.
Figure 11A:
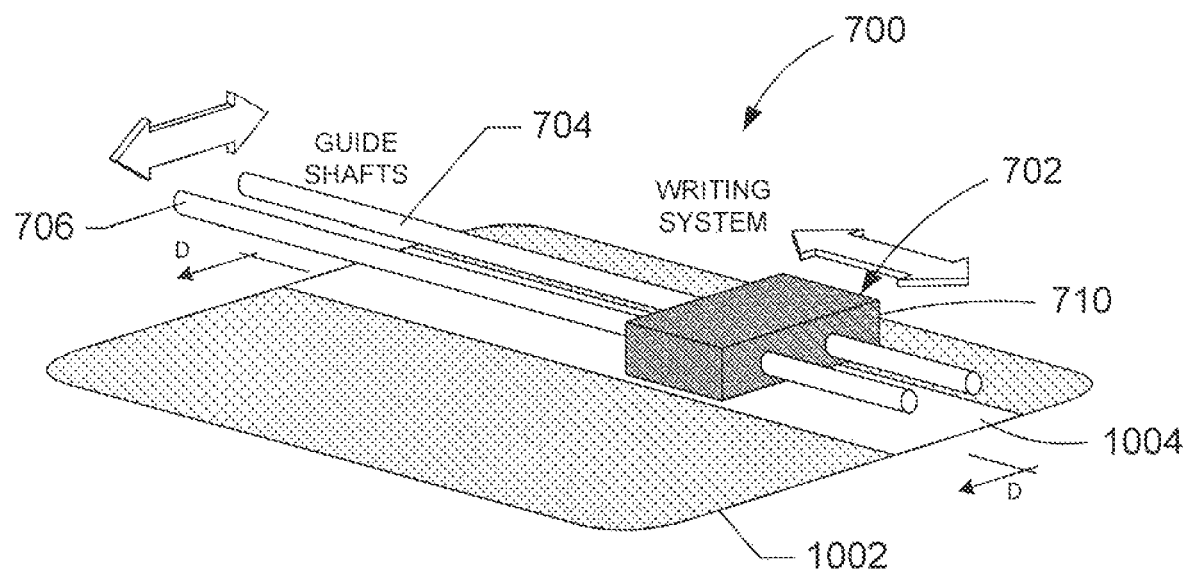
FIGS. 11A-11B show an example of the writing system configured to write information to electronic paper strip of a card in accordance with one or more embodiments of the present invention.
Figure 11B:
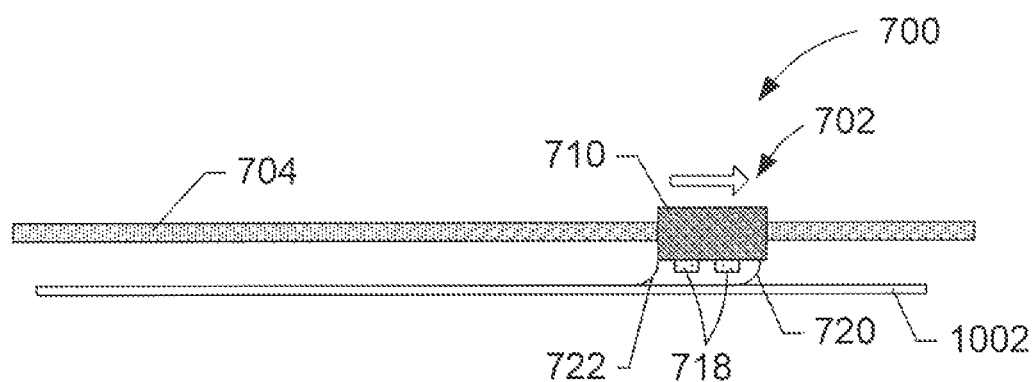

FIG. 10 shows an isometric view of an e-paper electronic writing machine 1000 and a card 1002 configured with a strip of e-paper 1004. The machine 1000 includes a slot 1006 for receiving 1008 and ejecting 1010 the card 1002. The e-paper strip 1004 can be used to display a variety of different types of written messages, as well as, images that can be read by the card holder. The machine 1000 includes a writing system, such as the writing systems 700 and 800. FIGS. 11A-11B show an example of the writing system 700 operated to write information to the e-paper strip 1004 of the card 1002 inserted into the machine 1000. The writing system 700 can be operated to write information to the e-paper strip as described above with reference to FIG. 7. When the writing system 700 has completed writing information to the e-paper strip 1004, the card 1002 is ejected from the machine 1000.

Figure 12:
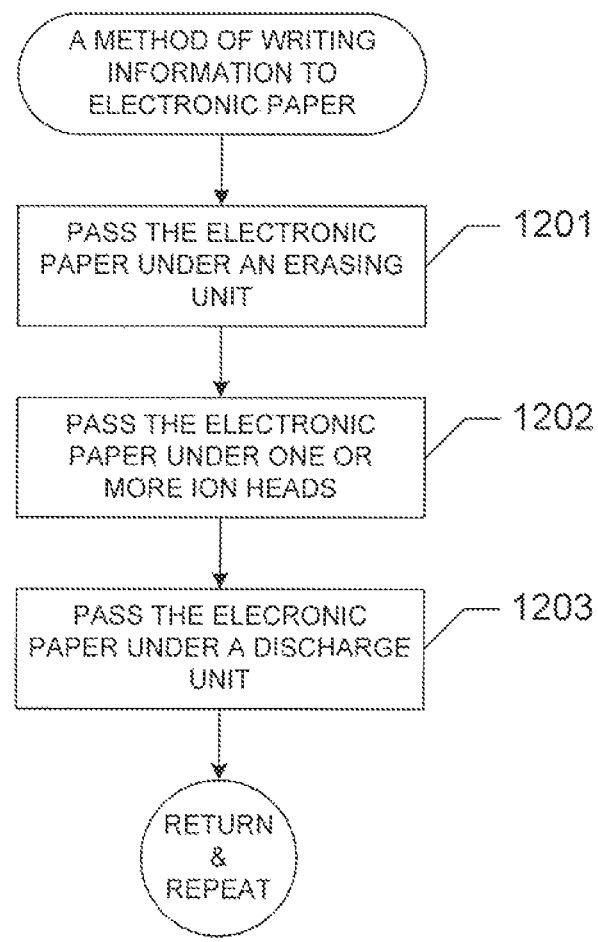
FIG. 12 shows a flow diagram of a method of writing information to electronic paper in accordance with one or more embodiments of the present invention.

FIG. 12 shows a flow diagram of a method of writing information to electronic paper. In step 1201, the electronic paper is passed under an erasing unit, which is configured to remove information stored in the electronic paper as described above with reference to FIGS. 3 and 5. In step 1202, the electronic paper is passed under one or more ion heads, which are configured to write information to the electronic paper as described above with reference to FIG. 3. In step 1203, the electronic paper is passed under a discharge unit configured to remove ions attached the surface of the electronic paper, as described above with reference to FIG. 4.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

The invention claimed is:

1. A device comprising:
a module comprising a first side spaced apart from and facing a first surface of a passive e-paper media and comprising:
an erasing unit to generate airborne electrical species having a first charge for attachment onto the first surface of the passive e-paper media to erase information in a fluid-containing microcapsule layer of the passive e-paper media; and
a writing unit to generate airborne electrical species having an opposite second charge for attachment onto the first surface of the passive e-paper media to write information in the fluid-containing microcapsule layer of the passive e-paper media,
wherein both the erasing unit and the writing unit are physically carried by, and positioned on, the first side of the module and wherein relative movement is to selectively occur between the module and the passive e-paper media during the erasing and the writing, and
wherein the erasing unit and the writing unit of the module are both positioned to be vertically suspended above the passive e-paper media.

2. The device of claim 1, wherein the module is stationary.

3. The device of claim 1, wherein the erasing unit is in a leading position and the writing unit is in a trailing position spaced apart from the erasing unit.

4. The device of claim 1, comprising a ground node associated with the imaging module and to be removably coupled relative to an entire conductive ground layer of the passive e-paper media.

5. The device of claim 1, comprising at least one of:
at least the erasing unit comprising at least one of a corona and an ion head to emit the airborne electrical species having the first charge; and
the writing unit comprising an ion head to emit the airborne electrical species having the opposite second charge.

6. The device of claim 1, wherein the module is configured to span the width of the passive e-paper media to write information in a single pass.

7. The device of claim 1, comprising a housing containing the module and including a slot through which the passive e-paper media is to enter as a card to become aligned for relative movement relative to the module during erasing and writing.

8. The device of claim 7, wherein the housing, the slot, and the module are arranged to erase and write the information relative to, and with, the passive e-paper media arranged as a strip on the card.

9. The device of claim 1, wherein the fluid-containing microcapsule layer comprises a plurality of microcapsules arranged in a side-by-side relationship with each microcapsule comprising, suspended within a first fluid, a plurality of first particles having a first charge, and wherein the first particles comprise a first color.

10. The device of claim 9, wherein each microcapsule comprises, suspended within the first fluid, a plurality of second particles having an opposite second charge, and wherein the second particles comprise a second color different than the first color.

11. The device of claim 1, wherein the module comprises a discharging unit in a trailing position relative to the writing unit to discharge at least some of the electrical species from the first surface of the passive e-paper media.

12. A method comprising:
causing relative movement between a writing module and a passive e-paper media with the writing module being vertically suspended above, spaced apart from, and facing the passive e-paper media, and with the passive e-paper media comprising a charge-receiving layer, a charge-responsive, fluid-containing microcapsule layer, and a ground electrode, wherein during such relative movement:
erasing information in the microcapsule layer in the passive e-paper media via first airborne electrical charges produced via a first unit of the writing module; and
writing information in the microcapsule layer in the passive e-paper media via second airborne opposite electrical charges produced via a second unit of the writing module, wherein both the respective first and second units are physically carried by, and located on a first side of the writing module to face the charge-receiving layer of the passive e-paper media.

13. The method of claim 12, comprising:
after writing information, removing at least some electrical charges attached to the charge-receiving layer of the passive e-paper media via a discharging unit associated with the writing module.

14. The method of claim 12, comprising at least one of:
the first unit comprising at least one of a corona and an ion-head to emit the airborne electrical charges; and
the second unit comprising an ion head to eject the second airborne opposite electrical charges as electrons or ions.

15. The method of claim 12, wherein the module is stationary.

16. The method of claim 12, comprising coupling the entire ground electrode layer relative to a ground node during the erasing and writing.

17. The method of claim 12, comprising performing the coupling without applying power to the ground electrode layer.

18. The method of claim 12, comprising:
   initiating the relative movement via inserting the passive e-paper media as a card into a slot of a housing, which contains the writing module.

19. The method of claim 12, comprising:
   the fluid-containing microcapsule layer comprising a plurality of microcapsules arranged in a side-by-side relationship, wherein each microcapsule comprises a first fluid within which is suspended a plurality of first particles having a first charge, and wherein the first particles comprise a first color.

20. The method of claim 19, where each microcapsule comprises, suspended within the first fluid, a plurality of second particles having an opposite second charge, and wherein the second particles comprise a second color different than the first color.

\* \* \* \* \*